US010397017B2

(12) United States Patent
    Broomhall et al.

(10) Patent No.: US 10,397,017 B2
(45) Date of Patent: Aug. 27, 2019

(54) COMMUNICATING INFORMATION ABOUT AVAILABLE NETWORKS

(71) Applicant: International Business Machines Corporation, Armonk, NY (US)

(72) Inventors: Matthew E. Broomhall, Goffstown, NH (US); Fabrizio N. Caldas, Sao Paulo (BR); Christopher R. Dotson, Lexington, KY (US); Michael R. Spano, Sr., Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 183 days.

(21) Appl. No.: 15/281,876

(22) Filed: Sep. 30, 2016

(65) Prior Publication Data
    US 2018/0097655 A1    Apr. 5, 2018

(51) Int. Cl.
    *H04L 12/24* (2006.01)
    *H04L 12/28* (2006.01)
    *H04L 12/66* (2006.01)
    *H04L 29/12* (2006.01)

(52) U.S. Cl.
    CPC .......... *H04L 12/2856* (2013.01); *H04L 12/66* (2013.01); *H04L 41/5045* (2013.01); *H04L 61/1511* (2013.01); *H04L 61/2015* (2013.01)

(58) Field of Classification Search
    CPC ................................................. H04L 12/2856
    USPC ......................................................... 709/225
    See application file for complete search history.

(56) References Cited

U.S. PATENT DOCUMENTS

| 6,418,463 | B1 | 7/2002 | Blevins |
| 6,934,715 | B2 | 8/2005 | Kalmes et al. |
| 7,007,294 | B1 | 2/2006 | Kurapati |
| 7,222,092 | B2 | 5/2007 | Grove et al. |
| 7,689,504 | B2 | 3/2010 | Warren et al. |

(Continued)

FOREIGN PATENT DOCUMENTS

| EP | 1964417 A2 | 9/2008 |
| WO | 2013077813 A1 | 5/2013 |

OTHER PUBLICATIONS

Becher et al.; "Law of Standard Form Contracts: Misguided Intuitions and Suggestions for Reconstruction, The"; DePaul Bus. & Comm. LJ 8 (2009): 199.

(Continued)

*Primary Examiner* — David R Lazaro
*Assistant Examiner* — Zia Khurshid
(74) *Attorney, Agent, or Firm* — Cantor Colburn LL; David Zwick

(57) ABSTRACT

Embodiments are directed to a computer-implemented method for communicating terms of service for providing internet access. The method includes establishing, using a gateway internet service provider (ISP) processor, a private network communications path between the gateway ISP processor and a client processor over a private area network. The method further includes transmitting, using the gateway ISP processor, data over the private network communications path, wherein the data includes terms of service that must be accepted by the client processor as one condition of the gateway ISP processor providing the client processor with internet access.

14 Claims, 5 Drawing Sheets

(56) References Cited

U.S. PATENT DOCUMENTS

| | | | |
|---|---|---|---|
| 2002/0026503 A1* | 2/2002 | Bendinelli | H04L 12/4641 |
| | | | 709/220 |
| 2004/0193530 A1 | 9/2004 | Hausman | |
| 2012/0238287 A1 | 9/2012 | Scherzer | |
| 2013/0155876 A1* | 6/2013 | Potra | H04W 36/14 |
| | | | 370/248 |
| 2014/0293829 A1* | 10/2014 | Visuri | H04L 12/145 |
| | | | 370/254 |

OTHER PUBLICATIONS

Janger et al.; "Gramm-Leach-Bliley Act, information privacy, and the limits of default rules, the"; Minn. L. Rev. 86 (2001): 1219.
Lemley; "Terms of use"; Minnesota Law Review 91 (2006): 459-483.

* cited by examiner

US 10,397,017 B2

COMMUNICATING INFORMATION ABOUT AVAILABLE NETWORKS

BACKGROUND

The present invention relates in general to processes for gaining access to the internet. More specifically, the present invention relates to methodologies, systems and computer program products for efficiently and effectively exchanging information that is necessary for a client computer to gain internet access through a private network of an internet service provider (ISP).

The domain name system (DNS) is a hierarchical decentralized naming system for computers, services, or any resource connected to the internet or a private network. DNS servers translate a domain name into an IP address that applications need in order to connect to an internet resource such as a website. DNS servers are implicitly trusted by internet-facing computers to correctly resolve names to the actual addresses that are registered by the owners of an internet domain. DNS hijacking or DNS redirection is the practice of subverting the resolution of DNS queries. The "hijacking" can be done by modifying the behavior of a trusted DNS server so that it does not comply with internet standards. ISPs and public/router-based online DNS server providers use DNS hijacking to direct unauthorized users to the ISP's own web servers where complete information about how to gain access to the internet through the ISP is communicated to the unauthorized user.

SUMMARY

Embodiments are directed to a computer-implemented method for communicating terms of service for providing internet access. The method includes establishing, using a gateway internet service provider (ISP) processor, a private network communications path between the gateway ISP processor and a client processor over a private area network. The method further includes transmitting, using the gateway ISP processor, data over the private network communications path, wherein the data includes terms of service that must be accepted by the client processor as one condition of the gateway ISP processor providing the client processor with internet access.

Embodiments are further directed to a computer-implemented method for communicating terms of service for providing internet access. The method includes accessing, using a client processor, a gateway ISP processor through a private network communications path over a private area network. The method further includes receiving, using the client processor, data over the private network communications path, wherein the data includes terms of service that must be accepted by the client processor as one condition of the gateway ISP processor providing the client processor with internet access.

Embodiments are further directed to a computer program product for communicating terms of service for providing internet access. The computer program product includes a computer readable storage medium having program instructions embodied therewith, wherein the computer readable storage medium is not a transitory signal per se. The program instructions are readable by a processor system to cause the processor system to perform a method. The method includes establishing a private network communications path between a gateway ISP processor and a client processor over a private area network. The method further includes transmitting data over the private network communications path, wherein the data includes terms of service that must be accepted by the client processor as one condition of the gateway ISP processor providing the client processor with internet access.

Additional features and advantages are realized through the techniques described herein. Other embodiments and aspects are described in detail herein. For a better understanding, refer to the description and to the drawings.

BRIEF DESCRIPTION OF THE DRAWINGS

The subject matter which is regarded as embodiments is particularly pointed out and distinctly claimed in the claims at the conclusion of the specification. The foregoing and other features and advantages of the embodiments are apparent from the following detailed description taken in conjunction with the accompanying drawings in which:

Figure 1:
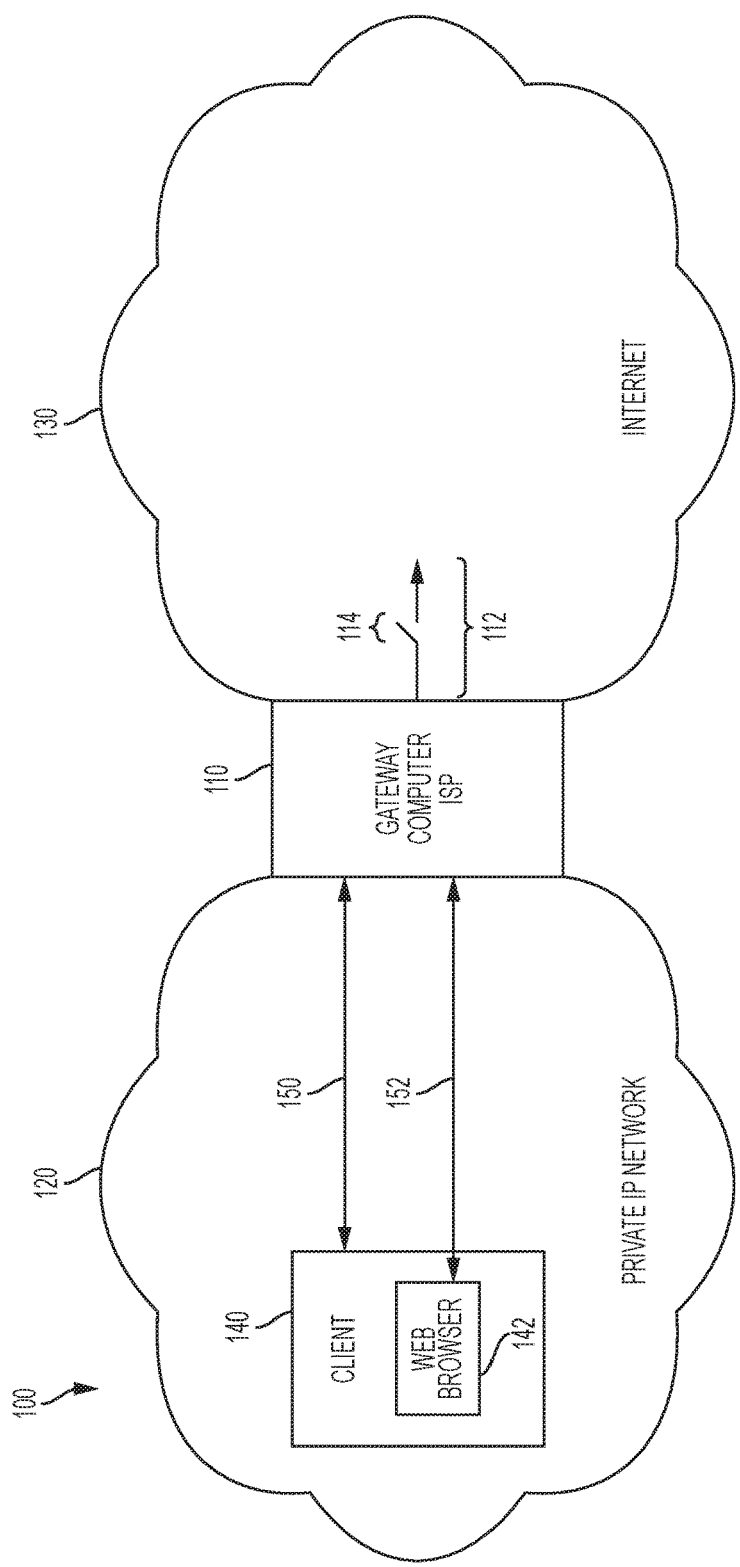
FIG. 1 depicts a block diagram illustrating an example of a network communications system in accordance with one or more embodiments of the present invention.

In the accompanying figures and following detailed description of the disclosed embodiments, the various elements illustrated in the figures are provided with three digit reference numbers. The leftmost digit of each reference number corresponds to the figure in which its element is first illustrated.

DETAILED DESCRIPTION

It is understood in advance that, although this disclosure includes a detailed description of particular types of electronic communications and exchanges that occur through private and internet-based communications networks, the teachings recited herein are not limited to a particular type of electronic communication or network. Rather embodiments of the present disclosure are capable of being implemented in conjunction with any other type of electronic communication and/or communications network architecture, now known or later developed. For example, although features of the embodiments described herein are specific to 802.11 wireless protocols (i.e., "WiFi"), the teachings of the described embodiments apply to other wired or wireless communications systems.

Various embodiments of the present disclosure are described herein with reference to the related drawings. Alternative embodiments can be devised without departing from the scope of this disclosure. It is noted that various connections and positional relationships (e.g., over, below, adjacent, etc.) are set forth between elements in the following description and in the drawings. These connections and/or positional relationships, unless specified otherwise, can be direct or indirect, and the present disclosure is not intended to be limiting in this respect. Accordingly, a coupling of entities can refer to either a direct or an indirect coupling, and a positional relationship between entities can be a direct or indirect positional relationship.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

The term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

Turning now to an overview of technologies that are more specifically relevant to embodiments of the present invention, wireless private networks are ubiquitous and available in a huge number of businesses and residences today. In a typical configuration, an ISP gateway server establishes private wired/wireless networks through which authorized client computers can access the internet. To gain authorization, a client computer must access the ISP private network and communicate with the ISP gateway server to become authorized and gain internet access. However, the only information initially presented to a client computer, and the user behind it, is the network name ("SSID"). This is a maximum of 32 characters and is not sufficient to provide much useful information about the connection. As a result, organizations perform "URL hijacking" or "DNS hijacking," where the first web browser request made by the client computer's web browser after connecting to the private network is redirected to the ISP's system where the client computer is provided with information about the connection and accept the terms of use. This process is error prone. For example, the user/client computer doesn't necessarily open a web browser immediately upon connecting to the private network. Sometimes the user/client computer wants to use non-web applications, such as a VPN client.

Embodiments of the present the present invention provide methodologies, systems and computer program products for efficiently and effectively exchanging information that is necessary for a client computer to gain internet access through a private network of an ISP. More specifically, embodiments of the present invention provide a means for a private ISP network to provide an arbitrary amount of information about itself, such as the terms of service including whether any fees are charged for use. In addition, the ISP can require the user to digitally sign legally enforceable terms of service (for example, by clicking OK or even by a signing service) before allowing internet access. In one or more embodiments, this agreement can be automatically signed by the client computer each time ("remember my agreement"), and only be presented to the user again if it is determined that the terms of service have changed.

Figure 4:
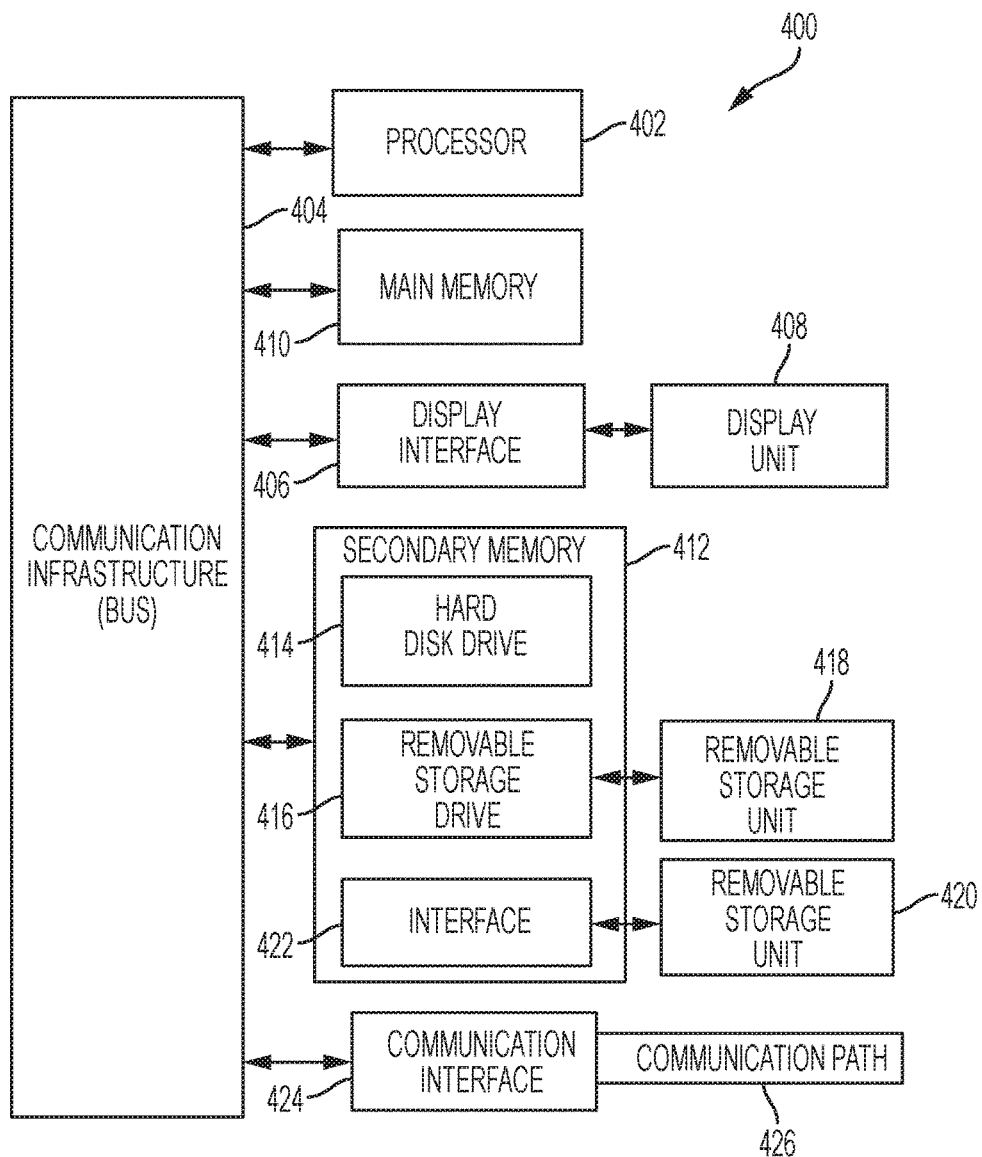
FIG. 4 depicts a block diagram of a computer system in accordance with one or more embodiments of the present invention.

Turning now to a more detailed description of the present invention, FIG. 1 depicts a block diagram illustrating a network communications system 100 in accordance with one or more embodiments. System 100 includes a gateway computer 110, which provides ISP services that include allowing authorized computers within a private IP network 120 of the gateway computer 110 to access the internet 130. Client computer 140 is within private IP network 120. In one or more embodiments, client computer 140 and gateway computer 110 can be implemented as a wide variety of computing devices such as a smart phone, a smartwatch, a laptop, a desktop and the like. Additional details of an exemplary configuration for client computer 140 and gateway computer 110 are depicted in FIG. 4 at computer system 400, which is described in greater detail later in this detailed description.

Initially, client computer 140 is not authorized to access the internet 130 through gateway computer 110. In order to gain authorization, client computer 140 must accept the terms of service (TOS) of the ISP of the gateway computer 110. Without benefit of the teachings of the present invention, if the client computer 140 desires to access the internet 130 through the private IP network 120 of the gateway computer 110, the client computer 140 has to access the private IP network 120, and then initiate the process of becoming authorized by opening the web browser 142 of the client computer 140 and attempting to access the internet 130 from web browser 142 through communications path 152 and the gateway computer 110. In one or more embodiments, communications path 152 can be wired or wireless. When the gateway computer 110 determines that client computer 140 is unauthorized, gateway computer 110 implements a DNS hijacking or DNS redirection to subvert the resolution of DNS queries by modifying the behavior of a trusted DNS server so that it does not comply with internet standards. Gateway computer 110, through DNS hijacking, redirects the internet access request of the web browser 142 to a web server (not shown) that provides the unauthorized web browser 142 and client computer 140 with the TOS that must be accepted in order to gain access to the internet 130 through the gateway computer 110.

According to embodiments of the present invention, client computer 140, which is initially unauthorized, is automatically offered the opportunity to access private IP network 120 in a conventional manner, including for example, being assigned by gateway computer 110 a private network IP address over communications path 150. In one or more embodiments, the communications path 150 is wired or wireless. In one or more embodiments, data is transmitted over communications path 150 using a dynamic host configuration protocol (DHCP). In one or more embodiments, data is transmitted over communications path 150 using an anycast protocol. With communications path 150 established, and with the client computer 140 assigned an IP address, gateway computer 110 automatically communicates TOS over communications path 150 to client computer 140. In one or more embodiments, the TOS can include the payment of any required fees. In one or more embodiments, the client computer 140 displays the TOS to a user on a display (not shown) of the client computer 140. In one or more embodiments, the TOS is displayed in a dialogue box or a pop up window.

If the TOS are acceptable to the user of the client computer 140, the client computer 140 transmits over communications path 150 to gateway computer 110 data that indicates that the TOS are accepted. Upon receiving the data that indicates that the TOS are accepted, the gateway computer 110 authorizes the client computer 140 to access the internet 130 through the gateway computer 110 by closing a virtual switch 114 to open an internet access communications path 112. Accordingly, embodiments of the present invention provide client computer 140 and gateway computer 110 with a technique for exchanging TOS, accepting TOS, and granting the client computer 140 access to the internet 130 through the gateway computer 110. In embodiments of the present invention, the web browser 142 of the web client 140 is not involved in the TOS exchange and the TOS acceptance, nor is the gateway computer 110 required to incur the complexity and time expenditure of employing a "DNS hijack" of an initial unauthorized attempt to initiate a web browsing session in order to exchange the TOS information necessary to authorize the client computer 110. In one or more embodiments, the TOS are provided to the client computer 140 over communications path 150 of private IP network 120 automatically after the client computer 140 has accessed the private IP network 120.

In one or more embodiments, the TOS exchange over communications path 150 can be even more efficient by providing a capability to determine whether or not the TOS has been previously accepted by the client computer 140, and to automatically accept the TOS if it has been previously accepted by the client computer 140. In one or more embodiments, if it is determined that the TOS has been previously accepted by the client computer 140, the gateway computer 110 is automatically notified that the TOS is acceptable without the TOS being transmitted over communications path 150 to the client computer 140. In one or more embodiments, if it is determined that the TOS has been previously accepted by the client computer 140, the gateway computer 110 is automatically notified that the TOS is acceptable without the TOS being displayed at the client computer 140. In one or more embodiments, if it is determined that the TOS has been previously accepted by the client computer 140, instead of displaying the TOS, the client computer 140 displays a notification that the TOS has previously been accepted, and prompts the user/client computer 140 to confirm that the TOS is still acceptable. Upon receiving the conformation, the gateway computer 110 authorizes the client computer 140 to access the internet 130 through its web browser 142 and the gateway computer 110. Additional variations of methodologies for determining whether or not the TOS has been previously accepted by the client computer 140, and for accepting the TOS if it has been previously accepted by the client computer 140, are provided in the flow diagrams shown in FIGS. 2, 3A and 3B and described in greater detail herein.

Figure 2:
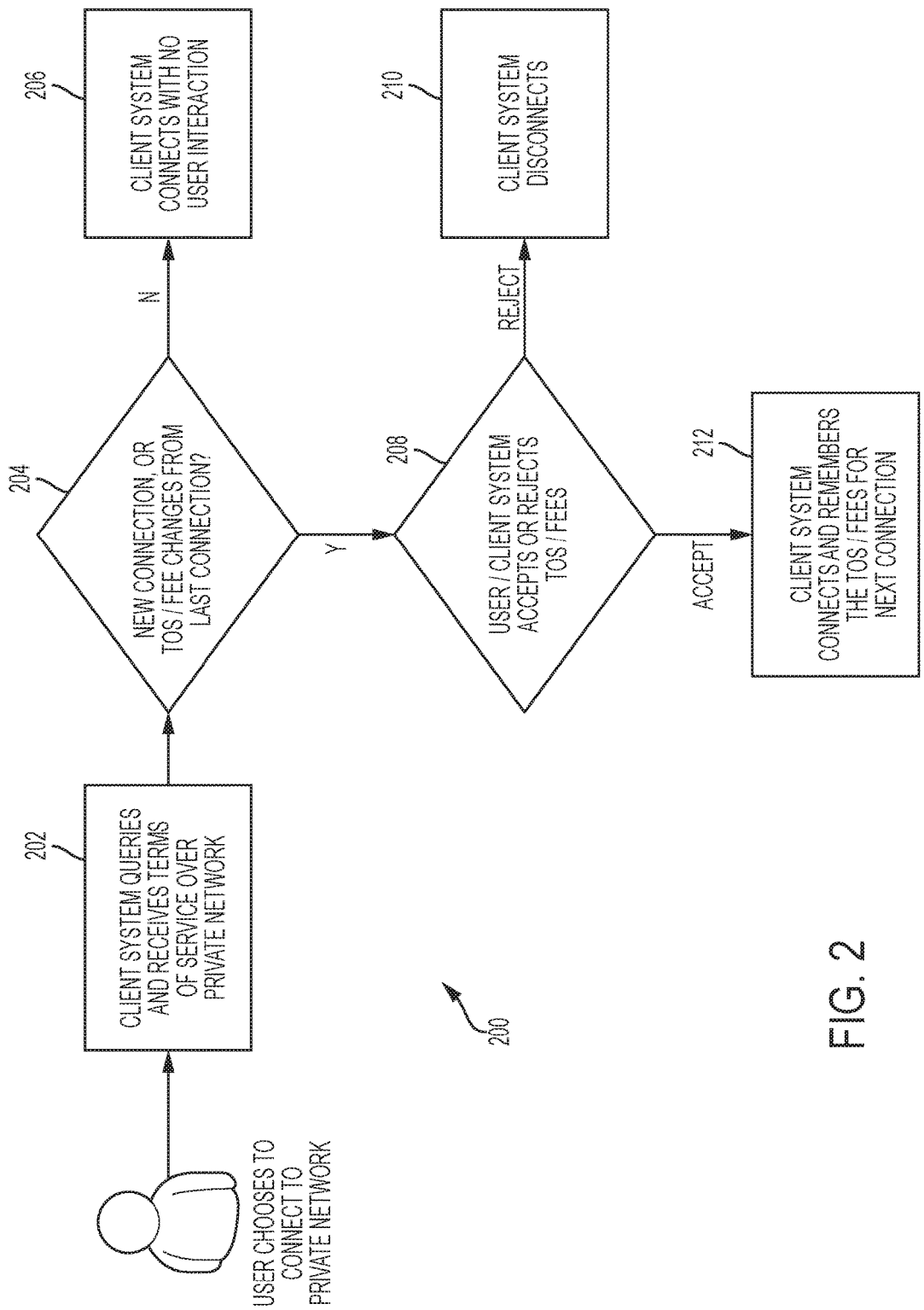
FIG. 2 depicts a flow diagram illustrating a methodology in accordance with one or more embodiments of the present invention.

FIG. 2 depicts a flow diagram illustrating a methodology 200 that can be performed by system 100 (shown in FIG. 1) in accordance with one or more embodiments of the present invention. Methodology 200 begins when a user chooses to connect to private IP network 120 using client computer 140. At block 202, client systems queries and receives TOS over private IP network 120. Methodology 200 then moves to decision block 204, which determines whether the connection to the private IP network 120 is a new connection, or whether the TOS (including fees) has changed from the last connection of the client computer 140 to the private IP network 120. If the answer to the inquiry at decision block 204 is no, methodology 200 moves to block 206 where the gateway computer 110 authorizes the client computer 140 to access the internet 130 using the web browser 142 of the client computer 140. If the answer to the inquiry at decision block 204 is yes, methodology 200 moves to decision block 208 where the user/client computer 140 accepts or rejects the TOS. If the TOS is rejected at decision block 208, methodology 200 moves to block 210 where the client computer 140 disconnects from the private IP network 120.

If the TOS is accepted at decision block 208, methodology 200 moves to block 212 where the gateway computer 110 authorizes the client computer 140 to access the internet 130 through the web browser 142 of the client computer 140, and the client computer 140 stores the TOS in order to "remember" the TOS for the next connection.

Figure 3A:
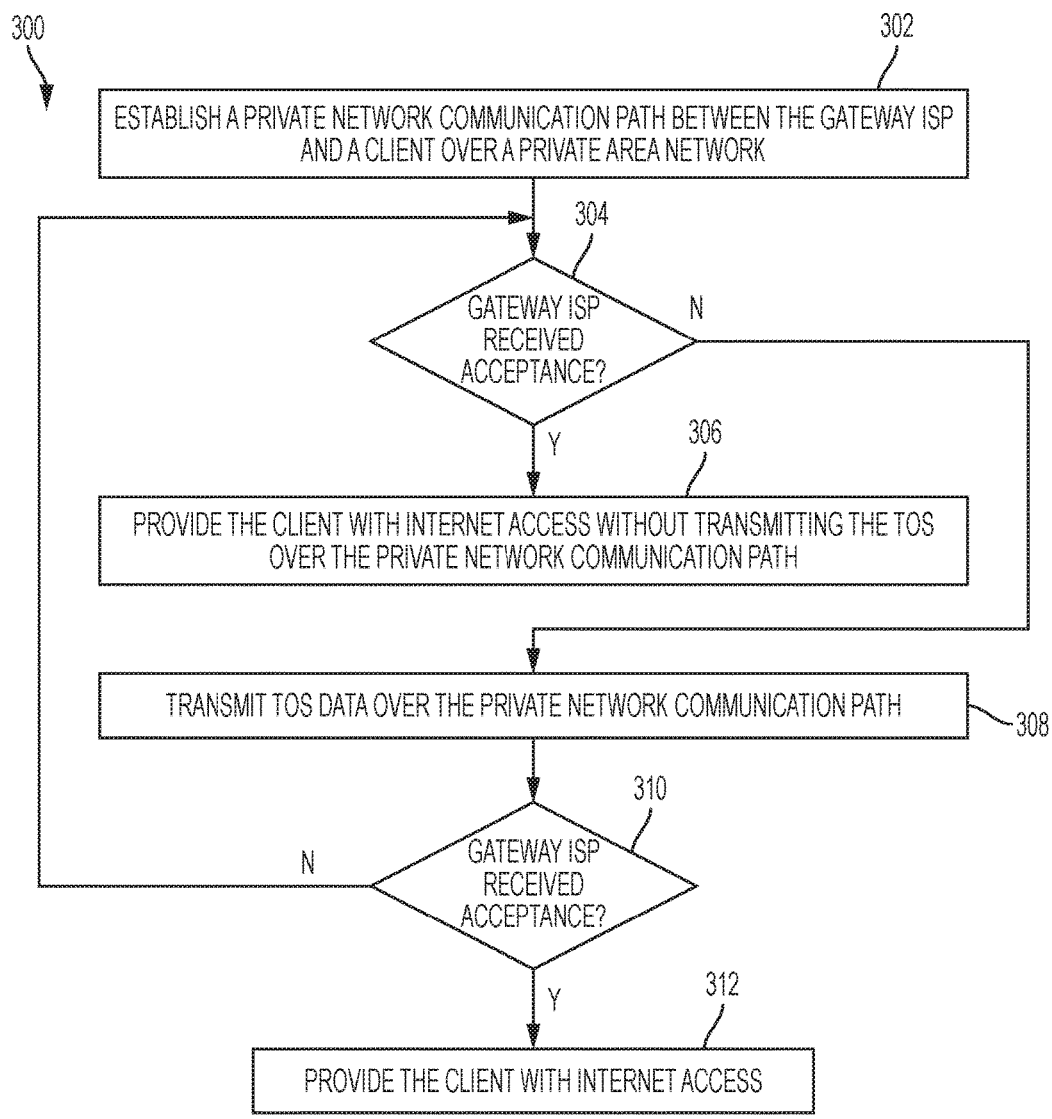
FIG. 3A depicts a flow diagram illustrating a methodology in accordance with one or more embodiments of the present invention.

FIG. 3A depicts a flow diagram illustrating a methodology 300 in accordance with one or more embodiments of the present invention. Methodology 300 focuses on the exchange of TOS primarily from the point of view of the gateway ISP. Methodology 300 begins at block 302 by establishing a private network communications path between a gateway ISP and a client computer over a private area network. Methodology 300 moves to decision block 304 to determine whether the gateway ISP has received an acceptance. If the answer to the inquiry at decision block 304 is yes, methodology 300 moves to block 306 and provides the client computer with internet access without transmitting the TOS over the private area network communications path. If the answer to the inquiry at the decision block 304 is no, the methodology 300 moves to block 308 and transmits TOS over the private network communications path. Methodology 300 moves to decision block 310 and determines whether the gateway ISP has received an acceptance. If the answer to the inquiry at decision block 310 is yes, methodology moves to block 312 and provides the client with internet access. If the answer to the inquiry at decision block 310 is no, methodology return to the input to decision block 304.

Figure 3B:
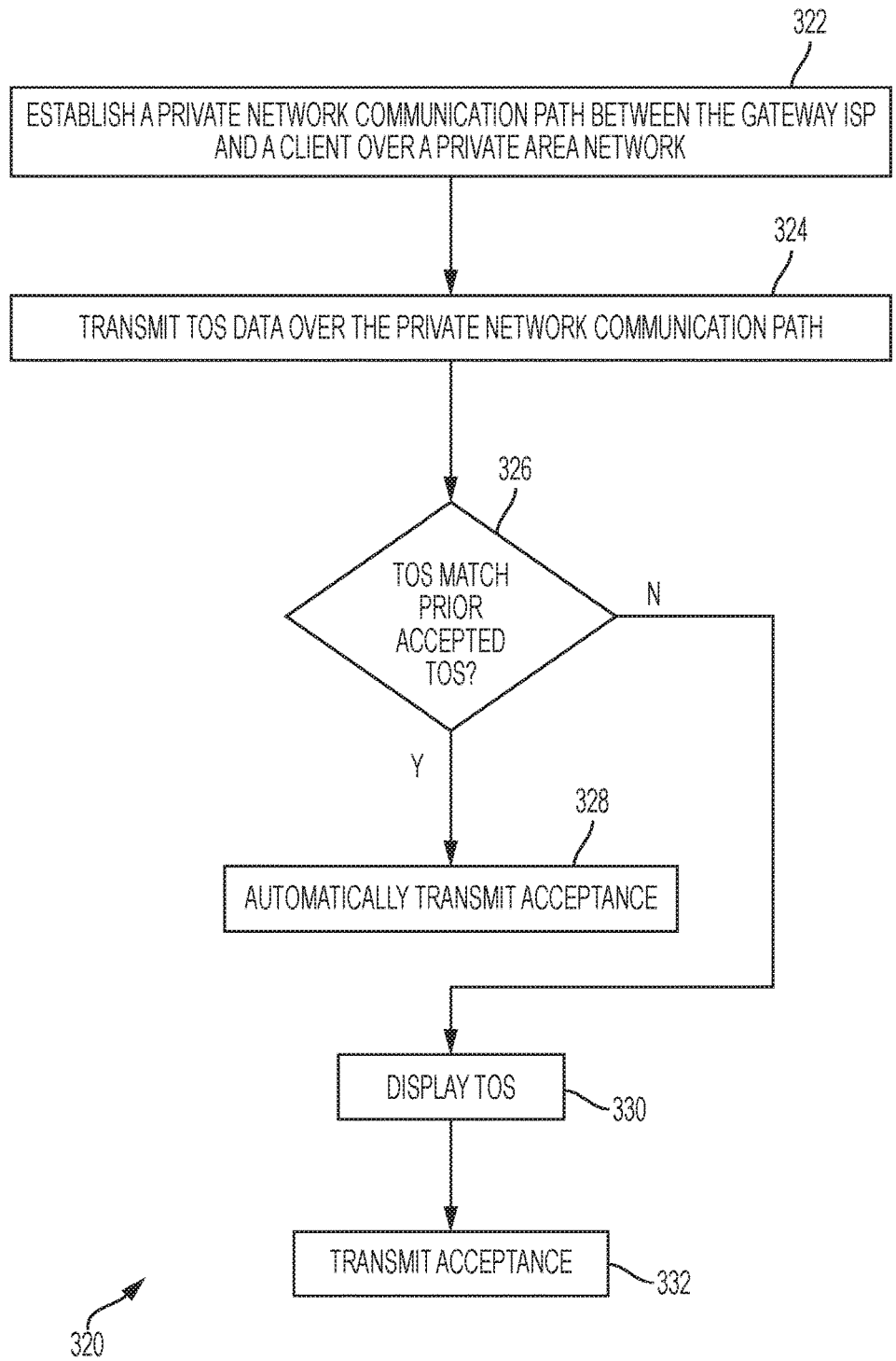
FIG. 3B depicts a flow diagram illustrating a methodology in accordance with one or more embodiments of the present invention.

FIG. 3B depicts a flow diagram illustrating a methodology 320 in accordance with one or more embodiments of the present invention. Methodology 320 focuses on the exchange of TOS primarily from the point of view of the client computer. Methodology 320 begins at block 322 by establishing a private network communications path between a gateway ISP and a client computer over a private area network. Block 324 transmits TOS over the private network communications path. Methodology 320 moves to decision block 326 to determine whether the received TOS matches a prior accepted TOS. If the answer to the inquiry at decision block 326 is yes, methodology 320 moves to block 328 and automatically transmits an acceptance to the gateway ISP. If the answer to the inquiry at the decision block 326 is no, the methodology 320 moves to block 330 and displays the TOS on display of the client computer. At block 332, upon instruction from the user, client computer transmits an acceptance of the TOS.

FIG. 4 depicts a high level block diagram computer system 400, which can be used to implement one or more embodiments of the present disclosure. More specifically, computer system 400 can be used to implement hardware components of client computer 140 and gateway computer 110 shown in FIG. 1. Although one exemplary computer system 400 is shown, computer system 400 includes a communications path 426, which connects computer system 400 to additional systems (not depicted) and can include one or more wide area networks (WANs) and/or local area networks (LANs) such as the Internet, intranet(s), and/or wireless communication network(s). Computer system 400 and additional system are in communication via communications path 426, e.g., to communicate data between them.

Computer system 400 includes one or more processors, such as processor 402. Processor 402 is connected to a communication infrastructure 404 (e.g., a communications bus, cross-over bar, or network). Computer system 400 can include a display interface 406 that forwards graphics, textual content, and other data from communication infrastructure 404 (or from a frame buffer not shown) for display on a display unit 408. Computer system 400 also includes a main memory 410, preferably random access memory (RAM), and can also include a secondary memory 412. Secondary memory 412 can include, for example, a hard disk drive 414 and/or a removable storage drive 416, representing, for example, a floppy disk drive, a magnetic tape drive, or an optical disk drive. Removable storage drive 416 reads from and/or writes to a removable storage unit 418 in a manner well known to those having ordinary skill in the art. Removable storage unit 418 represents, for example, a floppy disk, a compact disc, a magnetic tape, or an optical disk, etc. which is read by and written to by removable storage drive 416. As will be appreciated, removable storage unit 418 includes a computer readable medium having stored therein computer software and/or data.

In alternative embodiments, secondary memory 412 can include other similar means for allowing computer programs or other instructions to be loaded into the computer system. Such means can include, for example, a removable storage unit 420 and an interface 422. Examples of such means can include a program package and package interface (such as that found in video game devices), a removable memory chip (such as an EPROM, or PROM) and associated socket, and other removable storage units 420 and interfaces 422 which allow software and data to be transferred from the removable storage unit 420 to computer system 400.

Computer system 400 can also include a communications interface 424. Communications interface 424 allows software and data to be transferred between the computer system and external devices. Examples of communications interface 424 can include a modem, a network interface (such as an Ethernet card), a communications port, or a PCM-CIA slot and card, etcetera. Software and data transferred via communications interface 424 are in the form of signals which can be, for example, electronic, electromagnetic, optical, or other signals capable of being received by communications interface 424. These signals are provided to communications interface 424 via communications path (i.e., channel) 426. Communications path 426 carries signals and can be implemented using wire or cable, fiber optics, a phone line, a cellular phone link, an RF link, and/or other communications channels.

In the present disclosure, the terms "computer program medium," "computer usable medium," and "computer readable medium" are used to generally refer to media such as main memory 410 and secondary memory 412, removable storage drive 416, and a hard disk installed in hard disk drive 414. Computer programs (also called computer control logic) are stored in main memory 410 and/or secondary memory 412. Computer programs can also be received via communications interface 424. Such computer programs, when run, enable the computer system to perform the features of the present disclosure as discussed herein. In particular, the computer programs, when run, enable processor 402 to perform the features of the computer system. Accordingly, such computer programs represent controllers of the computer system.

Thus it can be seen from the forgoing detailed description that one or more embodiments of the present invention provide technical benefits and effects. Rather than using "URL hijacking," which only works if the user starts a web browser immediately and attempts to go to a web site, embodiments of the present invention automatically communicate full information about the network, its operator, and any terms of use to the wireless (or wired) client.

When a client computer having the functionality describe in the present in this invention attempts to connect to a wireless network, it will receive information about the connection, such as the fees charged by the service and other terms of service. This information can be communicated to the wireless client by the wireless client connecting to a well-known anycast IP address, by information in the DHCP response, or by other means. If user determines that the terms of service are acceptable, the client system accepts the terms of service. If this is the first time the user has connected to the service, or if the fees or terms have changed since the last connection, the wireless client can then present this information to the user and gain any approvals necessary. If the fees or terms of service are not accepted by the user, the user will not be prompted to join the network again unless the terms of service or fees are updated.

Using embodiments of the present invention, the user can specify fees (such as free) and other terms of service (such as no illegal activities) that are acceptable ahead of time. The wireless client can then accept those terms of service without displaying them, and only display "unusual" terms of service to the user. This protects the user by avoiding the "scroll to the bottom and click accept without reading" behavior that most users adopt. The user will only be presented with terms if they don't match the user's list of acceptable terms. This requires the client and the service operator to agree on specific terms of service clause wording, probably in a structured format, so that the client can match them against the list that the user has approved.

In one or more embodiments, the local client computer takes the terms of service into account when evaluating local user actions, such as going to a bank's web site, and warns the user based on parameters of the connection. In one or more embodiments, enterprise mobile device management can be used to dictate which terms of service are acceptable and which are not, in addition to what the local user directs.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A computer-implemented method for providing internet access, the method comprising:
    establishing, using a gateway internet service provider (ISP) processor, a first private network communications path between the gateway ISP processor and a client processor over a private area network;

wherein the first private network communications path is not routed through a web browser of the client processor;

wherein the first private network communications path does not provide the client processor with internet access;

transmitting, using the gateway ISP processor, data over the private network communications path;

wherein the data comprises inquiry data and information data;

wherein the information data comprises terms of service that must be accepted by the client processor as one condition of the gateway ISP processor providing the client processor with internet access;

receiving, using the gateway ISP processor, response data from the client processor over the first private network communications path, wherein the response data is responsive to the inquiry data; and based at least in part on determining that the response data comprises an acceptance of the terms of service, providing, using the gateway ISP processor, the client processor with internet access through the web browser of the client processor and a second private network communications path of the private area network.

2. The computer-implemented method of claim 1, wherein establishing the first private network communications path comprises the gateway ISP assigning a private network address to the client processor.

3. The computer-implemented method of claim 1, wherein transmitting data over the first private network communications path comprises a communications protocol.

4. The computer-implemented method of claim 3, wherein the communications protocol comprises a dynamic host configuration protocol (DHCP).

5. The computer-implemented method of claim 1 further comprising:

prior to transmitting terms of service over the first private network communications path, determining that the gateway ISP processor has received response data that comprises an acceptance by the client processor of the terms of service; and based at least in part on determining that the gateway ISP processor has received response data that comprises an acceptance by the client processor of the terms of service, providing, using the gateway ISP processor, the client processor with internet access without transmitting the terms of service over the first private network communications path.

6. A computer-implemented method for providing internet access, the method comprising:

accessing, using a client processor, a gateway internet service provider (ISP) processor through a first private network communications path over a private area network;

wherein the first private network communications path is not routed through a web browser of the client process;

wherein the first private network communications path does not provide the client processor with internet access;

receiving, using the client processor, data over the private network communications path;

wherein the data comprises inquiry data and information data;

wherein the information data comprises terms of service that must be accepted by the client processor as one condition of the gateway ISP processor providing the client processor with internet access;

transmitting, using the client processor, response data to the gateway ISP processor over the first private network communications path, wherein the response data is responsive to the inquiry data; and based at least in part on the response data comprising an acceptance of the terms of service, receiving, using the client processor, internet access through the gateway ISP processor;

wherein the gateway ISP processor provides the internet access through the web browser of the client processor and a second private network communications path of the private area network.

7. The computer-implemented method of claim 6, wherein establishing the first private network communications path comprises the client processor receiving a private network address from the gateway ISP processor.

8. The computer-implemented method of claim 6, wherein transmitting data over the first private network communications path comprises a communications protocol.

9. The computer-implemented method of claim 8, wherein the communications protocol comprises a dynamic host configuration protocol (DHCP).

10. The computer-implemented method of claim 6, further comprising:

based at least in part on determining that the terms of service match previously accepted terms of service, automatically transmitting, using the client processor, response data to the gateway ISP processor over the first private network communication path, wherein the response data comprises an acceptance of the terms of service.

11. A computer program product for providing internet access, the computer program product comprising:

a computer readable storage medium having program instructions embodied therewith, wherein the computer readable storage medium is not a transitory signal per se, the program instructions readable by a processor system to cause the processor system to perform a method comprising:

establishing a first private network communications path between a gateway ISP processor and a client processor over a private area network;

wherein the first private network communications path is not routed through a web browser of the client process; and wherein the first private network communications path does not provide the client processor with internet access;

transmitting data over the first private network communications path;

wherein the data comprises inquiry data and information data;

wherein the information data comprises terms of service that must be accepted by the client processor as one condition of the gateway ISP processor providing the client processor with internet access;

identifying that response data has been transmitted over the first private network communications path, wherein the response data is responsive to the inquiry data; and based at least in part on determining that the response data comprises an acceptance of the terms of service, establishing internet access for the client processor through the web browser of the client processor, a second private network communication path of the private area network, and the gateway ISP processor.

12. The computer program product of claim 11, wherein establishing the first private network communications path comprises establishing a private network address for the client processor.

13. The computer program product of claim 11, wherein:
- transmitting data over the first private network communications path comprises a communications protocol; and
- the communications protocol comprises a dynamic host configuration protocol (DHCP).

14. The computer program product of claim 11 further comprising:
- prior to transmitting terms of service over the first private network communications path, determining that the gateway ISP processor has received response data that comprises an acceptance by the client processor of the terms of service; and
- based at least in part on determining that the gateway ISP processor has received the response data that qualifies as an acceptance by the client processor of the terms of service, providing, using the gateway ISP processor, the client processor with internet access without transmitting the terms of service over the private network communications path.

* * * * *